United States Patent [19]
Gersbeck

[11] 3,726,627
[45] Apr. 10, 1973

[54] VULCANIZING OF RUBBER AND OTHER LIKE SHEET MATERIAL

[75] Inventor: Rolf Gersbeck, Hannover, Germany

[73] Assignee: Hermann Berstorff Maschinenbau G.m.b.H., Hannover-Kleefeld, Germany

[22] Filed: Mar. 9, 1971

[21] Appl. No.: 122,342

[52] U.S. Cl. .............................................. 425/371
[51] Int. Cl. ............................................. B29h 5/00
[58] Field of Search .................. 18/6 E; 425/363, 425/371

[56] References Cited

UNITED STATES PATENTS

| | | |
|---|---|---|
| 2,442,443 | 6/1948 | Swallow ........................... 18/6 E |
| 2,526,318 | 10/1950 | Battin ............................. 18/6 E |
| 3,121,912 | 2/1964 | Deckmann ........................ 18/6 E |
| 2,142,972 | 1/1939 | Bierer ........................... 18/6 E X |
| 2,182,317 | 12/1939 | Knowland ........................ 18/6 E |
| 3,495,297 | 2/1970 | Nagato ........................... 18/6 E |
| 3,594,866 | 7/1971 | Skinner .......................... 18/6 E |

*Primary Examiner*—J. Howard Flint, Jr.
*Attorney*—Mason, Mason & Albright

[57] ABSTRACT

Apparatus for vulcanizing rubber and other like sheet material comprises a heated drum against which the sheet material is pressed by two overlying endless belts. The endless belts are entrained around discrete sets of guide rollers.

2 Claims, 1 Drawing Figure

PATENTED APR 10 1973
3,726,627
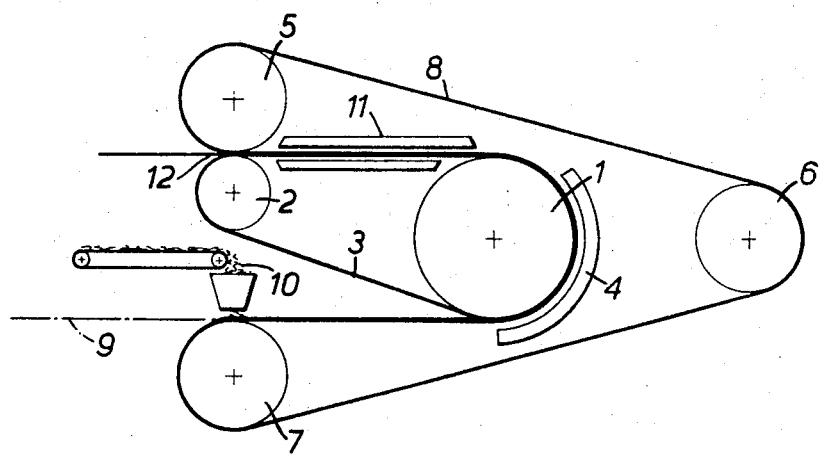
INVENTOR
ROLF GERSBECK
BY
Mason, Mason & Albright
ATTORNEYS

VULCANIZING OF RUBBER AND OTHER LIKE SHEET MATERIAL

BACKGROUND ON THE INVENTION

1. Field of the Invention

The invention relates to apparatus for vulcanizing rubber and other sheet like material.

2. Description of the Prior Art

In one vulcanizing apparatus proposed hitherto, the sheet is pressed by two endless belts against a heated rotary drum. These belts both extend around the same guide rollers, and the two belts are subjected to frictional forces that cause extra wear, as a result of which the working life of the two belts is relatively short. Additionally, the frictional forces produced between the belts where they extend around the guide rollers increases the power required to drive the belts.

SUMMARY OF THE INVENTION

According to the present invention, there is provided apparatus for vulcanizing rubber and other like sheet material, said apparatus comprising a first endless belt, a first discrete set of guide rollers, a second endless belt, a second discrete set of guide rollers, and a heated rotary drum, said first endless belt being entrained around said first set of guide rollers and a portion of said drum, and said second endless belt being entrained around said second set of guide rollers and a portion of the drum, the part of said second endless belt entrained around the drum overlying the part of the first endless belt entrained around the drum, and said sheet material being pressed against said drum by said endless belts.

BRIEF DESCRIPTION OF THE DRAWING

An embodiment of the invention will now be described, by way of example only, with reference to the accompanying diagrammatic drawing, the sole FIGURE of which is a side elevation of apparatus in accordance with the invention.

DESCRIPTION OF THE PREFERRED EMBODIMENT

There is shown in the drawing a rotary drum 1, heated by heaters 2, disposed around part of the drum periphery.

The reference numerals 3 and 4 designate two endless belts, by which sheeting 5, made of rubber or the like, is pressed firmly against part of the periphery of the drum 1. As a result of the heating of the sheeting 5 by the heaters 2 and of the contact pressure of the two belts 3 and 4, the sheeting 5 is vulcanized.

The belt 4, which is preferably made of sheet steel, is entrained around guide rollers 6, 7, 8 and 9 and a portion of the drum. The belt, 3, on the other hand, is preferably woven from stranded steel wire and is entrained around guide rollers 10, 11 and 12, which are separate from the rollers 6 to 9, and a portion of the drum, the part of the belt 3 entrained around the drum overlying the part of the belt 4 entrained around the drum. In other words, the two belts 3 and 4 pass round separate or discrete sets of guide rollers, so that these two belts 3 and 4 do not come into contact with each other except at the portion of the drum periphery against which both belts bear. The wear on the belts is thereby reduced to a minimum.

Whereas motion is imparted to the belt 4, for example, by driving the guide roller 6, the belt 3, is moved by virtue of its contact with the belt 4. Alternatively, a separate drive can be provided for the belt 3.

Because of the use of discrete sets of guide rollers, the two belts make contact with each other only where they bear against the heated drum, and not where they pass round the guide rollers, and hence the two belts have a relatively long working life. Additionally, the power required to drive the belts is relatively low.

Since both the steel belts press the sheet material into contact with part of the drum periphery, the pressure on the material is twice as great throughout this arc of double contact than where the heated drum has only a single steel or steel-mesh belt passing round it.

What is claimed is:

1. Apparatus for vulcanizing rubber and other like sheet material, said apparatus comprising
   a first endless belt,
   a first discrete set of guide rollers,
   a second endless belt,
   a second discrete set of guide rollers, and
   a heated rotary drum, said first endless belt being entrained only around said first set of guide rollers and a portion of said drum, and said second endless belt being entrained only around said second set of guide rollers and a portion of the drum, the part of said second endless belt entrained around the drum overlying the part of the first endless belt entrained around the drum, and said sheet material being pressed against said drum by said parts of both endless belts.

2. Apparatus as claimed in claim 1 wherein one of said endless belts comprises sheet steel, and the other of said endless belts comprises a woven material.

* * * * *